(12) United States Patent
Schweet et al.

(10) Patent No.: US 11,914,761 B1
(45) Date of Patent: Feb. 27, 2024

(54) SYSTEMS AND METHODS FOR VIRTUAL ARTIFICIAL INTELLIGENCE DEVELOPMENT AND TESTING

(71) Applicant: SAEC/Kinetic Vision, Inc., Cincinnati, OH (US)

(72) Inventors: Richard Raymond Schweet, Kirkland, WA (US); Bendenetto Christopher Ruggiero, Cincinnati, OH (US); Kyle Robert Hartshorn, Cincinnati, OH (US); Gregory Ryan Sweeney, Cincinnati, OH (US); Kyle Dean Cypher, Houston, TX (US); Melissa Yenni Scharf, Cincinnati, OH (US); Emily Ann Meyer, Denver, CO (US); Alec Brenders Lisy, Cincinnati, OH (US); Jeremy David Jarrett, Cincinnati, OH (US); Matthew David Fye, Cincinnati, OH (US)

(73) Assignee: SAEC/Kinetic Vision, Inc., Cincinnati, OH (US)

( * ) Notice: Subject to any disclaimer, the term of this patent is extended or adjusted under 35 U.S.C. 154(b) by 0 days.

(21) Appl. No.: 18/143,659

(22) Filed: May 5, 2023

Related U.S. Application Data

(63) Continuation of application No. 17/752,018, filed on May 24, 2022, now Pat. No. 11,644,891, which is a continuation of application No. 16/919,983, filed on Jul. 2, 2020, now Pat. No. 11,372,474.

(60) Provisional application No. 62/870,326, filed on Jul. 3, 2019.

(51) Int. Cl.
*G06F 3/01* (2006.01)
*G06N 20/00* (2019.01)
*G06N 5/04* (2023.01)
*G06Q 30/0201* (2023.01)

(52) U.S. Cl.
CPC ............... *G06F 3/011* (2013.01); *G06N 5/04* (2013.01); *G06N 20/00* (2019.01); *G06Q 30/0201* (2013.01)

(58) Field of Classification Search
CPC .......... G06F 3/011; G06F 3/014; G06F 3/017; G06N 5/04; G06N 20/00; G06Q 30/0201
See application file for complete search history.

(56) References Cited

U.S. PATENT DOCUMENTS

| | | | |
|---|---|---|---|
| 6,054,991 A * | 4/2000 | Crane | G06T 15/10 345/420 |
| 6,166,744 A * | 12/2000 | Jaszlics | G06T 17/00 345/629 |
| 7,319,992 B2 | 1/2008 | Gaos | |

(Continued)

OTHER PUBLICATIONS

Becominghuman, "Immersive Virtual Reality AI and Its Near-Coming Effects"; retrieved from https://becominghuman.ai/immersive-virtual-reality-ai-and-its-near-coming-effects-40f530efe7e0, Jul. 19, 2019; 12 pages.

(Continued)

*Primary Examiner* — Benyam Ketema
(74) *Attorney, Agent, or Firm* — Frost Brown Todd LLP

(57) ABSTRACT

Systems and methods are provided to create training data, validate, deploy and test artificial intelligence (AI) systems in a virtual development environment, incorporating virtual spaces, objects, machinery, devices, subsystems, and actual human action and behavior.

32 Claims, 5 Drawing Sheets

(56) References Cited

U.S. PATENT DOCUMENTS

| | | | | |
|---|---|---|---|---|
| 8,597,142 | B2* | 12/2013 | Mayles | A63F 13/213 |
| | | | | 473/226 |
| 8,600,550 | B2* | 12/2013 | Kurzweil | B25J 13/00 |
| | | | | 700/78 |
| 8,704,855 | B1* | 4/2014 | Berme | A63F 13/218 |
| | | | | 345/633 |
| 8,963,916 | B2* | 2/2015 | Reitan | G06F 3/011 |
| | | | | 345/419 |
| 8,982,151 | B2* | 3/2015 | Tardif | G06F 3/1423 |
| | | | | 345/670 |
| 9,047,698 | B2* | 6/2015 | Maciocci | H04N 9/3173 |
| 9,215,293 | B2* | 12/2015 | Miller | G06F 3/012 |
| 9,628,477 | B2* | 4/2017 | Smith | H04L 67/306 |
| 9,865,089 | B2* | 1/2018 | Burns | G02B 27/017 |
| 9,921,641 | B1* | 3/2018 | Worley, III | G06F 3/017 |
| 9,971,491 | B2* | 5/2018 | Schwesinger | G06F 3/0304 |
| 10,044,982 | B2 | 8/2018 | Wilson et al. | |
| 10,365,784 | B2 | 7/2019 | Inomata | |
| 10,540,812 | B1* | 1/2020 | Yildiz | G06T 15/50 |
| 10,642,564 | B2* | 5/2020 | Takano | G06F 3/013 |
| 10,679,412 | B2* | 6/2020 | Griffin | A63F 13/35 |
| 2001/0056574 | A1* | 12/2001 | Richards | H04N 7/002 |
| | | | | 348/E7.071 |
| 2002/0060648 | A1* | 5/2002 | Matsui | G06F 3/011 |
| | | | | 345/8 |
| 2008/0043013 | A1 | 2/2008 | Gruttadauria et al. | |
| 2012/0249741 | A1* | 10/2012 | Maciocci | G06T 19/006 |
| | | | | 348/51 |
| 2013/0117377 | A1* | 5/2013 | Miller | H04L 67/131 |
| | | | | 709/205 |
| 2014/0306866 | A1* | 10/2014 | Miller | G06F 3/013 |
| | | | | 345/8 |
| 2014/0368537 | A1* | 12/2014 | Salter | G06F 3/011 |
| | | | | 345/633 |
| 2015/0248845 | A1* | 9/2015 | Postlethwaite | G09B 19/24 |
| | | | | 434/234 |
| 2016/0100034 | A1* | 4/2016 | Miller | A63F 13/35 |
| | | | | 709/205 |
| 2016/0182502 | A1* | 6/2016 | Smith | H04L 63/0884 |
| | | | | 726/7 |
| 2016/0188277 | A1* | 6/2016 | Miyasaka | G09G 3/003 |
| | | | | 345/2.2 |
| 2016/0210783 | A1* | 7/2016 | Tomlin | G02B 27/017 |
| 2016/0214011 | A1* | 7/2016 | Weising | G09G 5/08 |
| 2016/0260251 | A1* | 9/2016 | Stafford | G02B 27/0179 |
| 2016/0350973 | A1* | 12/2016 | Shapira | G06F 3/011 |
| 2017/0053456 | A1* | 2/2017 | Cho | G06F 1/163 |
| 2017/0061688 | A1* | 3/2017 | Miller | G06T 7/60 |
| 2017/0092086 | A1* | 3/2017 | Keller | G06F 3/016 |
| 2017/0168585 | A1* | 6/2017 | Faaborg | G06F 3/147 |
| 2017/0178272 | A1* | 6/2017 | Lashkari | G06T 1/20 |
| 2017/0201722 | A1* | 7/2017 | Wilson | H04N 7/147 |
| 2017/0237789 | A1* | 8/2017 | Harner | H04L 65/4015 |
| | | | | 709/205 |
| 2017/0282062 | A1* | 10/2017 | Black | A63F 13/25 |
| 2017/0324841 | A1* | 11/2017 | Clement | A63F 13/573 |
| 2018/0005429 | A1* | 1/2018 | Osman | A63F 13/56 |
| 2018/0039330 | A1* | 2/2018 | Delaney | G06F 3/011 |
| 2018/0101990 | A1* | 4/2018 | Yang | G06T 13/40 |
| 2018/0225131 | A1 | 8/2018 | Tommy et al. | |
| 2018/0225873 | A1 | 8/2018 | Murdock et al. | |
| 2018/0293785 | A1* | 10/2018 | Lee | G06T 19/003 |
| 2018/0295130 | A1* | 10/2018 | Lee | H04L 63/0861 |
| 2018/0349527 | A1 | 12/2018 | Li et al. | |
| 2019/0041976 | A1* | 2/2019 | Veeramani | G06F 3/011 |
| 2019/0065028 | A1* | 2/2019 | Chashchin-Semenov | G06F 3/04847 |
| 2019/0111336 | A1* | 4/2019 | Gutierrez | A63F 13/217 |
| 2019/0156222 | A1* | 5/2019 | Emma | G06F 16/22 |
| 2019/0258254 | A1 | 8/2019 | Kadin | |
| 2019/0313059 | A1* | 10/2019 | Agarawala | G06T 19/006 |
| 2019/0318542 | A1 | 10/2019 | Sai Krishna et al. | |
| 2019/0325771 | A1 | 10/2019 | Ghatage et al. | |
| 2019/0340306 | A1* | 11/2019 | Harrison | G06T 15/506 |
| 2019/0347547 | A1 | 11/2019 | Ebstyne et al. | |
| 2019/0362312 | A1* | 11/2019 | Platt | H04L 65/1069 |
| 2019/0362529 | A1 | 11/2019 | Wedig et al. | |
| 2019/0378340 | A1 | 12/2019 | Chia et al. | |
| 2019/0378476 | A1* | 12/2019 | Jeon | G06N 20/00 |
| 2020/0050904 | A1 | 2/2020 | Powers et al. | |
| 2020/0117788 | A1 | 4/2020 | Mohammad | |
| 2020/0118340 | A1 | 4/2020 | Rammos et al. | |
| 2020/0265633 | A1* | 8/2020 | Okutani | G06F 3/012 |
| 2020/0402314 | A1* | 12/2020 | Yerli | H04L 67/131 |
| 2021/0132380 | A1* | 5/2021 | Wieczorek | A63F 13/428 |
| 2021/0166484 | A1* | 6/2021 | Kim | G06V 20/56 |
| 2021/0357959 | A1* | 11/2021 | Cella | G06Q 10/087 |

OTHER PUBLICATIONS

Vanhorn et al., "Deep Learning Development Environment in Virtual Reality"; retrieved from https://arxiv.org/ftp/arxiv/papers/1906/1906.05925.pdf, Jun. 3, 2019; 10 pages.

* cited by examiner

SYSTEMS AND METHODS FOR VIRTUAL ARTIFICIAL INTELLIGENCE DEVELOPMENT AND TESTING

CROSS-REFERENCE TO RELATED APPLICATION

This application is a continuation of U.S. patent application Ser. No. 17/752,018, entitled SYSTEMS AND METHODS FOR VIRTUAL ARTIFICIAL INTELLIGENCE DEVELOPMENT AND TESTING, filed on May 24, 2022, which is a continuation of U.S. patent application Ser. No. 16/919,983, filed on Jul. 2, 2020, and issued as U.S. Pat. No. 11,372,474, entitled SYSTEMS AND METHODS FOR VIRTUAL ARTIFICIAL INTELLIGENCE DEVELOPMENT AND TESTING, which claims the benefit of U.S. provisional patent application Ser. No. 62/870,326, filed on Jul. 3, 2019, entitled A VIRTUAL AI DEVELOPMENT ENVIRONMENT TO TRAIN, DEPLOY AND TEST ARTIFICIAL INTELLIGENCE, MACHINE LEARNING, AND DEEP LEARNING SYSTEMS, the disclosures of which are incorporated herein by reference in their entirety.

BACKGROUND

Artificial Intelligence (AI) is a broad term used to describe computer systems that improve with the processing of more data, giving them the appearance of having human-like intelligence. More specific industry terms are Machine Learning, or a subset of machine learning called Deep Learning (DNN or Deep Neural Networks). Currently the data to train these systems and the deployment and testing of the systems use physical data and real environments. For example, developing a retail store AI system that understands product stock availability, proper product merchandising, and shopper behavior requires physical retail store mockups or test stores, actors or others performing the shopping tasks, and a very large number of product types, product shelf positions, stock in/out configurations, plus physical cameras, and shelf and other sensors that comprise the AI system. Providing the data variability needed to train the AI system requires that months or years of camera or sensor data be collected, while the product types, stock levels and shelf positions are randomly varied. The test data must represent many years of store operation in order to create an AI system that understands situations and actions it has not been exposed to before.

BRIEF DESCRIPTION OF THE DRAWINGS

The present disclosure will be more readily understood from a detailed description of some example embodiments taken in conjunction with the following figures.

DETAILED DESCRIPTION

Figure 1:
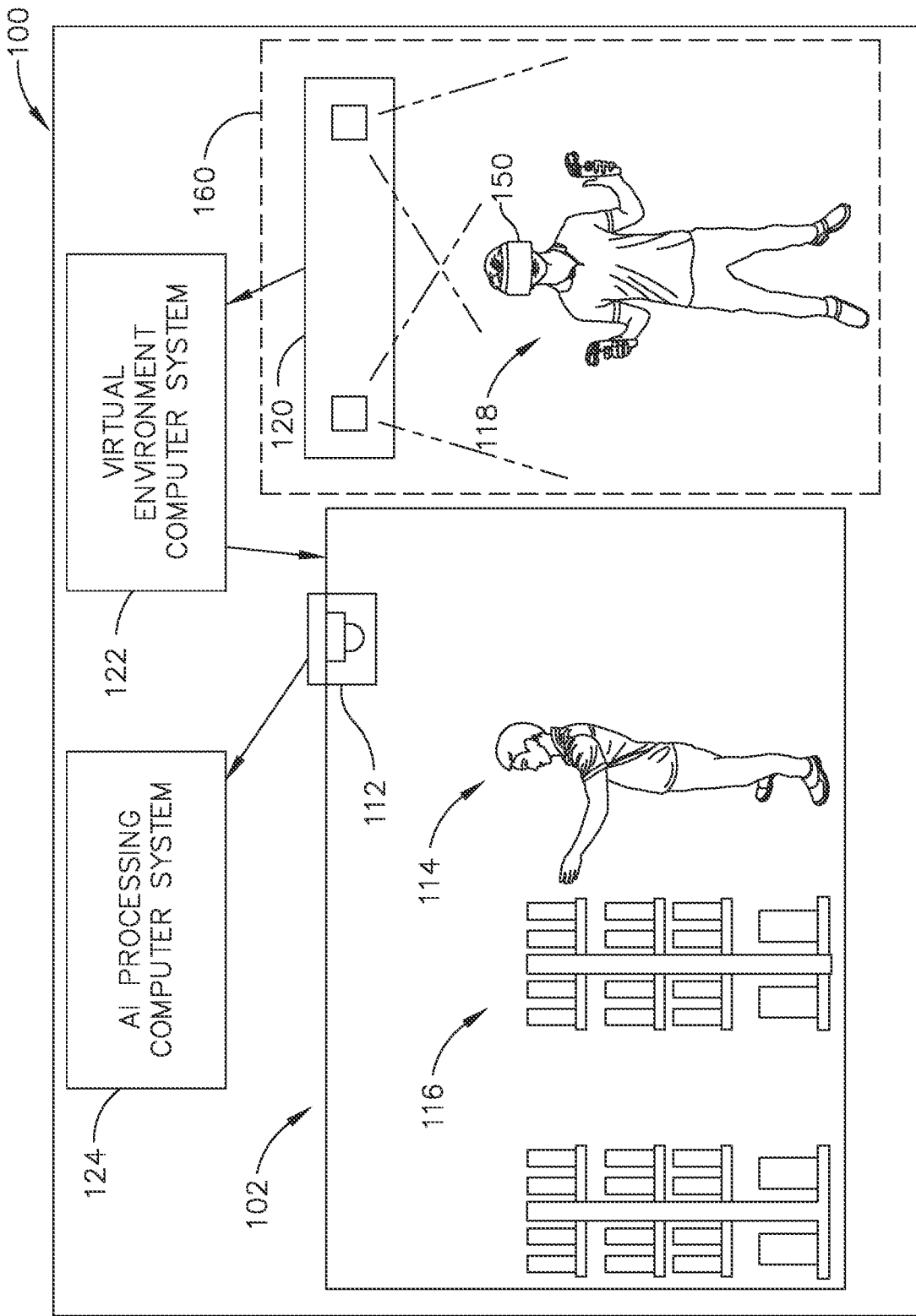
FIG. 1 schematically depicts a virtual AI development environment in accordance with one non-limiting example.

Various non-limiting embodiments of the present disclosure will now be described to provide an overall understanding of the principles of the structure, function, and use of AI development environments as disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in as least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term software is used expansively to include not only executable code, but also data structures, data stores, and computing instructions in any electronic format, firmware, and embedded software. The terms information and data are used expansively and can include a wide variety of electronic information, including but not limited to machine-executable or machine-interpretable instructions; content such as text, video data, and audio data, among others; and various codes or flags. The terms information, data, and content are sometimes used interchangeably when permitted by context.

The examples discussed herein are examples only and are provided to assist in the explanation of the systems and methods described herein. None of the features or components shown in the drawings or discussed below should be taken as mandatory for any specific implementation of any of these systems and methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

AI systems need to be trained and tested before deployment. As provided above, physical data and real environments are conventionally used in the development of AI systems. The use of purely physical data and physical test environments in the development of AI systems presents many limitations. For example, the physical data needed to train the AI system must already exist or be created. Although in some cases public datasets of image-based data may exist, this data is not typically tailored to the specific use-case. For example, autonomous automobiles (also known as "self-driving cars") require training data from billions of miles of driver experiences, and this training data is currently being created by competing companies at great time and cost expense.

Once sufficient data is obtained, it has to be manually annotated. This process of labeling the data informs the AI model what each image or group of images contains, such as, cars, pedestrians, bicyclists, roads, buildings, landscaping, traffic signage, as the case may be. Human labor is typically used to manually draw bounding boxes around each pertinent object in the scene and associate the appropriate label with the rectangular region. This process is inherently slow, costly, and prone to errors and inaccuracies as training datasets often contain hundreds of thousands or even millions of images.

With labeled training data the AI system can be trained and validated. The validation process consists of testing the model with data it has not seen before. Often this data is a subset of the training dataset but not used in training. If the validation process does not meet the required system accuracy specification, the AI model can be "tuned" and/or more training data can be utilized (with the associated time and cost to gather and label the additional data). Once the AI model passes the validation stage it is deployed into the test environment. The test environment could be a mock retail store, public roadways, or the homes of test volunteers, among others.

There are many inefficiencies in the conventional AI system development method. Any changes to the project goals or specifications can require repetition of the entire process, and physical environments, products and objects need to be constructed. By way of example, testing a retail AI system in a grocery store juice section instead of the cereal aisle requires that the physical mockup store be reconfigured, new products brought in, and the entire test process repeated. Testing with a wide range of shopper types often requires hiring human actors of different sizes, shapes, ethnicities, ages, shopping behaviors, etc. Moreover, camera-based AI systems are sensitive to lighting, camera positioning, lens parameters, and other factors that are difficult to create and vary physically. Data variability is essential for training AI models, but creating that variability with physical systems is extremely time-consuming, costly, and results in necessary compromises that could lead to system failure when the AI system is deployed outside of the specific physical development environment.

As described in more below, virtual AI development processes are presented where the AI model training data, system validation, system deployment, and system testing can be performed within a real-time three-dimensional (3D) virtual environment incorporating objects, camera systems, sensors and human-driven avatars. Generally, a virtual 3D spatial environment in accordance with the present disclosure can be networked with external computer resources to simulate the end-use environment of the AI system. This environment can include various sub-systems that feed data into the AI system, such as, but not limited to, force, weight, capacitance, temperature, position and motion sensors, LiDAR, infrared and depth-sensing 3D mapping systems, and video and still camera output. This data can be captured and utilized to train and validate the AI system, which can then itself be deployed into the same real-time virtual environment. Finally, real-time motion capture techniques and human actors can be used to drive humanoid avatars within the virtual environment, thus simulating all aspects of the physical space, such as spatial accuracy and content, human behavior, sensor and camera output, and AI system response.

Referring now to FIG. 1, an example virtual AI development environment 100 is schematically depicted. A virtual environment 102 is created by a virtual environment computer system 122. The virtual environment 102 created by a virtual environment computer system 122 can be a digital twin of a real-world physical environment, such that it is modeled to replicate the real-world physical environment. The real-world physical environment from which the digital twin virtual environment is modeled can be an actual real-world physical environment that is in existence at the time of modeling or a proposed real-world physical environment. The virtual environment can also include any number of virtual objects. One or more of the virtual objects can be interacted with by humanoid avatars within the virtual environment, as described in more detail below. Such virtual objects can be modeled from actual real-world physical objects that are in existence at the time of modeling or can be modeled from proposed real-world physical objects. In some embodiments, for example, the virtual environment can be modeled from a proposed real-world physical environment while the virtual objects within virtual environment can be modeled from actual real-world physical objects. While in other embodiments, the virtual environment can be modeled from an existing real-world physical environment and the virtual objects within virtual environment can be modeled from proposed real-world physical objects. Moreover, for virtual environments that include multiple virtual objects, some of those virtual objects can be modeled from proposed real-world physical objects while others can be modeled from existing real-world objects. In any case, the virtual environment can either be modeled from an existing or proposed real-world physical environment and each virtual object situated within the virtual environment can be modeled from an existing or proposed real-world physical object.

Thus, the retail environment depicted in the virtual environment 102 depicted in FIG. 1 can be a model of an actual real-world retail environment that is in existence at the time of modeling or it can be a model of a proposed real-world retail environment. Furthermore, while FIG. 1 depicts a retail environment for the purposes of illustration, this disclosure is not so limited as a wide variety of different environments can be created by the virtual environment computer system 122 without departing from the scope of the present disclosure. Such environments can include, without limitation, industrial environments, medical environments, marine environments, manufacturing environments, military environments, outdoor environments, and so forth. Thus, while a retail environment is provided in FIG. 1 for the purposes of illustration, other specific virtual environments 102 that can be created by a virtual environment computer system 122 can include, for example, a manufacturing line, a warehouse/distribution facility, an environment with a robotic system, an autonomous vehicle, an oil or gas production facility (land-based or offshore), a restaurant, a senior care facility, an aircraft, a ship, a submarine, a train, a space station, a space ship, and so forth, each of which can be modeled from a real-world physical environment. Furthermore, the virtual environment 102 can be representative of only a portion of an associated real-world physical environment. With regard to a retail environment, the virtual environment 102 can be a particular section or aisle of a real-world retail environment, for example.

The virtual environment 102 can incorporate a camera system 112, such as an RGB video camera system and/or other suitable camera system, and a humanoid avatar 114. Additionally or alternatively, the virtual environment 102 can include a virtual sensor system, which can model the operation of various sensors from the corresponding real world physical environment. Example sensors in a sensor system can include, without limitation, weight sensors, optical sensors, capacitance sensors, proximity sensors, temperature sensors, and so forth. As is to be appreciated, the number and type of virtual sensors incorporated into any virtual environment 102 can depend on the particular real-world physical environment that is being modeled. By way of example, a sensor system associated with a retail environment may be different from a sensor system associated with a medical environment or a manufacturing environment. As such, the virtual environments associated with each of the different real-world environments can model the operation of different types of sensor networks.

In the illustrated embodiment, the humanoid avatar 114 is a shopper within the retail environment. The virtual environment 102 of the illustrated embodiment also includes virtual product display 116 and a human actor 118. A real-time motion capture system 120 can be used to drive the motion of the humanoid avatar 114. The human actor 118 can be physically positioned within a studio 160. The studio 160 can be any suitable venue or location with equipment to present the human actor 118 with a virtual reality experience. Actions of the humanoid avatar 114 and positions of other objects in the virtual environment 102 can be recorded by the camera system 112, and the data stream can be fed into and processed by an AI processing computer system 124. Additionally, as the humanoid avatar 114 moves within the virtual environment 102 and interacts with various virtual objects, such as the virtual product display 116, various virtual sensors within the virtual environment 102 can stream information for the AI processing computer system 124 to process.

The humanoid avatar 114 can be controlled in real-time by the human actor 118. A virtual reality (VR) device 150, such as a VR headset or other suitable VR system, can enable the human actor 118 to visualize and experience the virtual environment 102 through a virtual reality interface of the VR device 150. In some embodiments, the VR device 150 can also include one or more hand controls, as shown in FIG. 1, to allow for the human actor 118 to interact with the virtual environment 102. The virtual environment computer system 122 can run software to create the virtual retail environment visual display in the VR device 150, simulate cameras and other sensors, and transmit data to other computer systems.

The physical motions of the human actor 118 can be captured by the real-time motion capture system 120 in the studio 160, converted into data to drive the humanoid avatar 114, and transmitted to the virtual environment computer system 122. In some embodiments, the human actor 118 can wear active trackers 172 to aid in the tracking of the human actor's movements. While the active trackers 172 are schematically shown as elbow and ankle cuffs in FIG. 1, it is to be appreciated that any suitable type of active tracker can be utilized. The video system stream of the virtual environment 102 can be fed into and processed by the AI software, which can be executing on the AI processing computer system 124. Results of the AI software processing can be stored and visually displayed on the AI processing computer system 124.

During a testing session, the human actor 118 in the studio 160 can interact with virtual objects in the virtual environment 102. In the case of a retail virtual environment 102, the human actor 118 can interact with, for example, retail products. In this fashion, through movements of the human actor 118 in the studio 160, the humanoid avatar 114 in the virtual environment 102 can, for example, select products from the product display 116 and put them in a shopping cart (not shown). It can be determined whether the AI processing computing system 124 correctly tracked the selected product through the shopping event. Such feedback regarding the successful or unsuccessful tracking of the selected product, as well as other aspects of the shopping event, can be learned to further train the AI processing computer system 124. Thus, important performance metrics can be identified through the virtual AI development environment 100 and calibrations to the AI system can be implemented before deployment of the AI system to the real-world physical environment. Moreover, the presently disclosed embodiments can provide data variability in the virtual environment 102 required to train the AI system. By way of example, for a retail environment, the product display 116 can be varied, the product types can be varied, the stock levels can be varied, and the lighting levels can be varied, among a wide variety of other variables.

Figure 2:
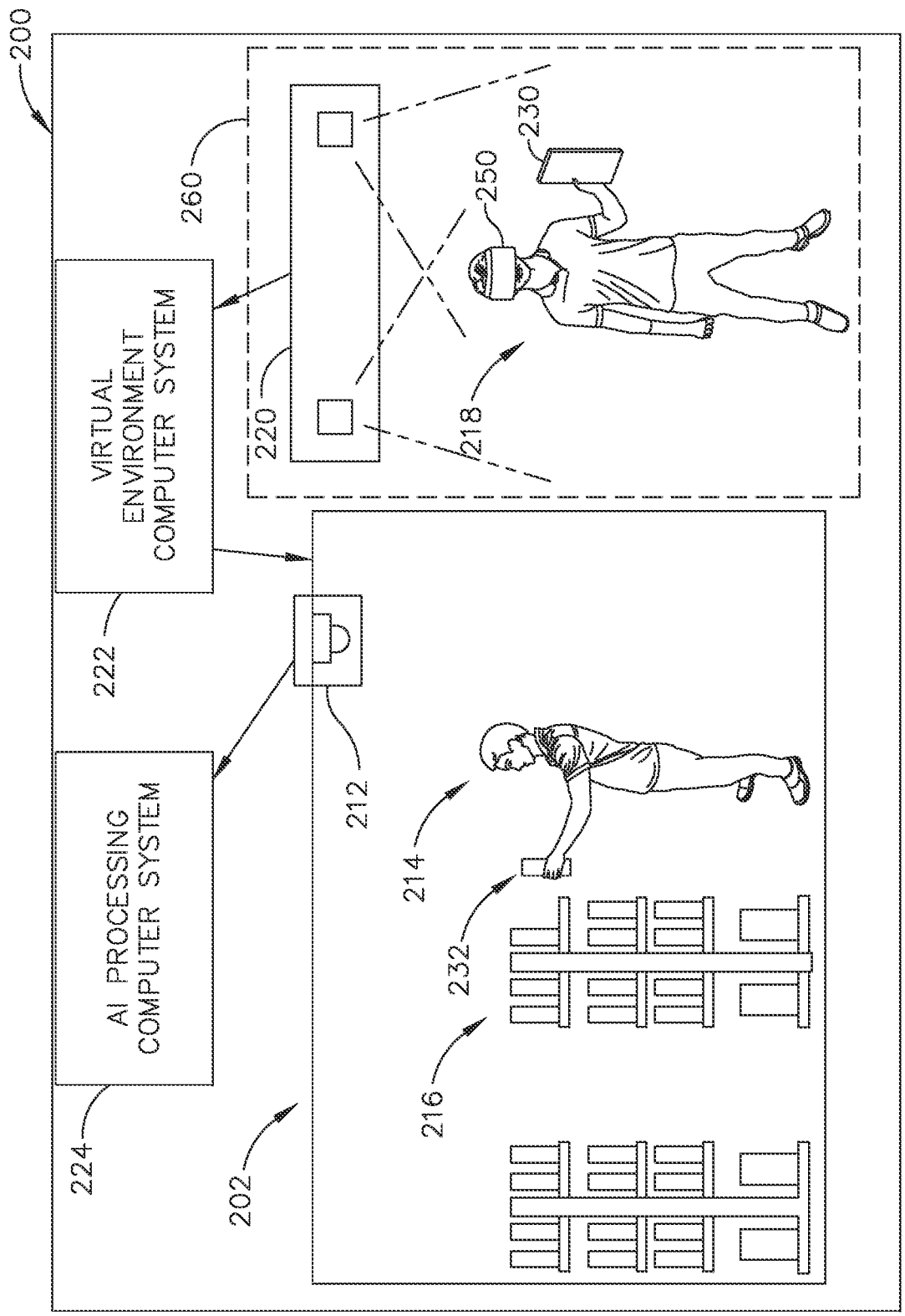
FIG. 2 schematically depicts a virtual AI development environment utilizing a virtual object that is modeled from a real-world physical object in accordance with one non-limiting example.

An alternative embodiment of a virtual AI development environment 200 is illustrated in FIG. 2 and can be similar to, or the same in many respects as, the virtual AI development environment 100 illustrated in FIG. 1. For example, as illustrated in FIG. 2, the virtual AI development environment 200 can include a virtual environment computer system 222, a real-time motion capture system 220, and a human actor 218 in a studio 260 can utilize a VR device 250 to visualize and experience a virtual environment 202 through a virtual reality interface of the VR device 250. Similar to virtual environment 102 of FIG. 1, the virtual environment 202 is a retail environment with a product display 216, however this disclosure is not so limited. Similar to FIG. 1, actions of a humanoid avatar 214 and positions of other objects in the virtual environment 202 can be recorded by a camera system 212, and the data stream can be fed into and processed by an AI processing computer system 224 for analysis and review. Additionally, data from any virtual sensors within the virtual environment 202 can be fed into and processed by an AI processing computer system 224 for processing.

In the example embodiment shown in FIG. 2, however, human actor 218 can physically interact with a physical training object 230 that is physically present in the studio 260. A virtual object 232 corresponding to the physical training object 230 is presented to the humanoid avatar 214 in the virtual environment 202 through the virtual reality interface of the VR device 250. The virtual object 232 can be modeled from a real-world physical object associated with the real-world physical environment represented by the virtual environment 202. The real-world physical object from which the virtual object is modeled can be an actual physical object that is in existence at the time of modeling or a proposed real-world physical object. The physical training object 230 can either be a mock-up of the real-world physical object or the real-world physical object itself. Further, the mock-up can be a replica of the real-world physical object or a simplified or basic version of the real-world physical object. By way of a non-limiting embodiment, the physical training object 230 may be a generic box, whereas within the virtual environment 202, the virtual object 232 can be presented as a particular brand of cereal, or other product, for example. In some embodiments, the human actor 218 can wear active trackers 272 and/or motion capture gloves 244 to aid in the real-time motion tracking of the human actor 218. As the human actor 218 physically handles the physical training object 230 in the studio 260, such manipulation can be tracked by the motion capture system 220 and translated into the humanoid avatar 214 virtually handling the virtual object 232 within the virtual environment 202. Therefore, during a testing session, the human actor 218 in the studio 260 can interact with one or more virtual objects 232 in the virtual environment 202 by manipulating physical training objects 230 in the studio 260. It can then be confirmed whether the AI processing computer system 224 accurately tracked the human actor 218, the actions of the human actor 218, and the one or more virtual objects 232.

Figure 3:
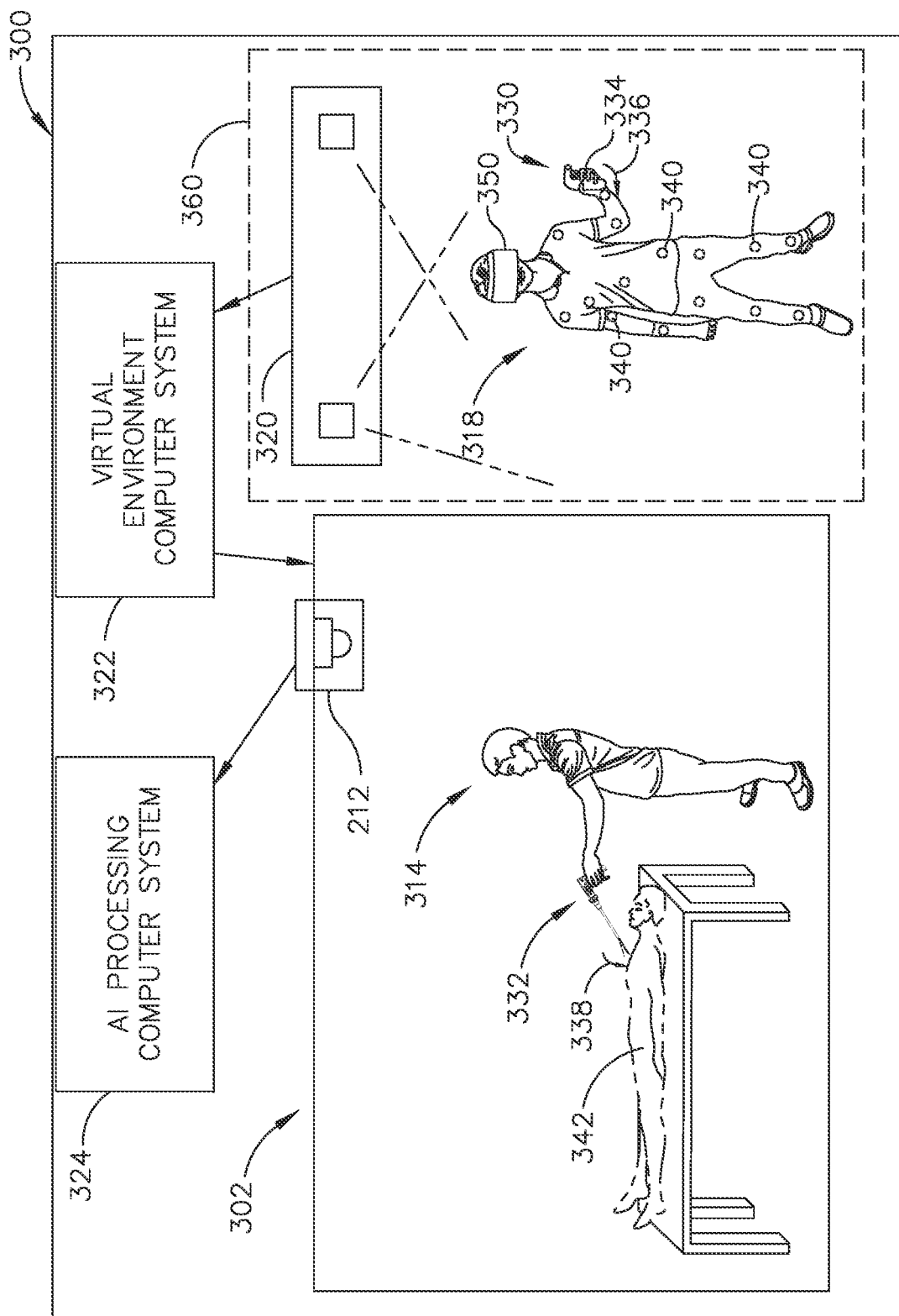
FIG. 3 schematically depicts another virtual AI development environment utilizing a virtual object that is modeled from a real-world physical object in accordance with one non-limiting example.

An alternative embodiment of a virtual AI development environment 300 is illustrated in FIG. 3 and can be similar to, or the same in many respects as, the virtual AI development environment 200 illustrated in FIG. 2. For example, as illustrated in FIG. 3, the virtual AI development environment 300 can include a virtual environment computer system 322, a real-time motion capture system 320, and a human actor 318 in a studio 360 can utilize a VR device 350 to visualize and experience a virtual environment 302 through a virtual reality interface of the VR device 350. Similar to FIG. 2, actions of a humanoid avatar 314 and positions of other objects in the virtual environment 302 can be recorded by a camera system 312, and the data stream can be fed into and processed by an AI processing computer system 324. Additionally, data from any virtual sensors within the virtual environment 302 can be fed into and processed by an AI processing computer system 324 for processing. Similar to FIG. 2, the human actor 218 can physically interact with a physical training object 330 that is physically present in the studio 360. In this embodiment, the physical training object 330 comprises physical actuator 334. While the physical actuator 334 is shown as a trigger in FIG. 3, this disclosure is not so limited. Instead, the physical actuator(s) 334 of the physical training object 330 can be any interactive element, such as a push button, slider, knob, and so forth. It is noted that the actuator 334 on the physical training object 330 does not necessarily need to be functional (i.e., does not need to cause any actuation of the physical training object 330). In any event, actuation of the physical actuator 334, as represented by actuation arrow 336, can cause actuation of a virtual object 332 that is presented to the humanoid avatar 314 in the virtual environment 302. The virtual object 332 can be modeled from a real-world physical object associated with the real-world physical environment represented by the virtual environment 302. In this example embodiment, the virtual environment 302 is a surgical environment and the virtual object 332 is a surgical tool. Thus, actuation of the physical actuator 334 can cause a specific type of actuation of the surgical tool in the virtual environment 302. The virtual environment 302 can include a virtual patient 342 and other objects or devices found in a surgical environment, for example.

The physical training object 330 can either be a mock-up of the real-world physical object or the real-world physical object itself. With regard to using a mock-up as a physical training object 330, a relatively quickly produced physical training object 330 can beneficially be used that is made out of wood, Styrofoam, 3D printed, or other method of production. The surgical device (or other type of device) for presentment to the human actor 318 through the VR device 350 can be modeled to the specifications of the actual surgical device. When the human actor 318 physically actuates the physical actuator 334 on the mock-up device, the human actor 318 will view an actuation 338 of the virtual object 332. Thus, as the human actor 318 physically handles the physical training object 330 in the studio 360, such manipulation can be tracked by the motion capture system 320 and translated into the humanoid avatar 314 virtually handling the virtual object 332 within the virtual environment 302.

In some embodiments, to aid in motion capture by the motion capture system 320, a plurality of markers 340 can be worn by the human actor 318 in the studio 360. The markers 340 can be passive markers or active trackers. Additionally or alternatively, the human actor 318 can wear motion capture gloves 344. Such motion capture gloves 344 can assist with, for example, the tracking of individual digits of the human actor 318. Moreover, the motion capture system 320 can be optical (i.e. camera-based) and/or a non-optical motion capture system. In any event, the motion capture system 320 can be used track various movements and gestures of the human actor 318, including the appendages of the human actor 318. In some embodiments, individual digits of the human actor 318 can also be tracked.

Figure 4:
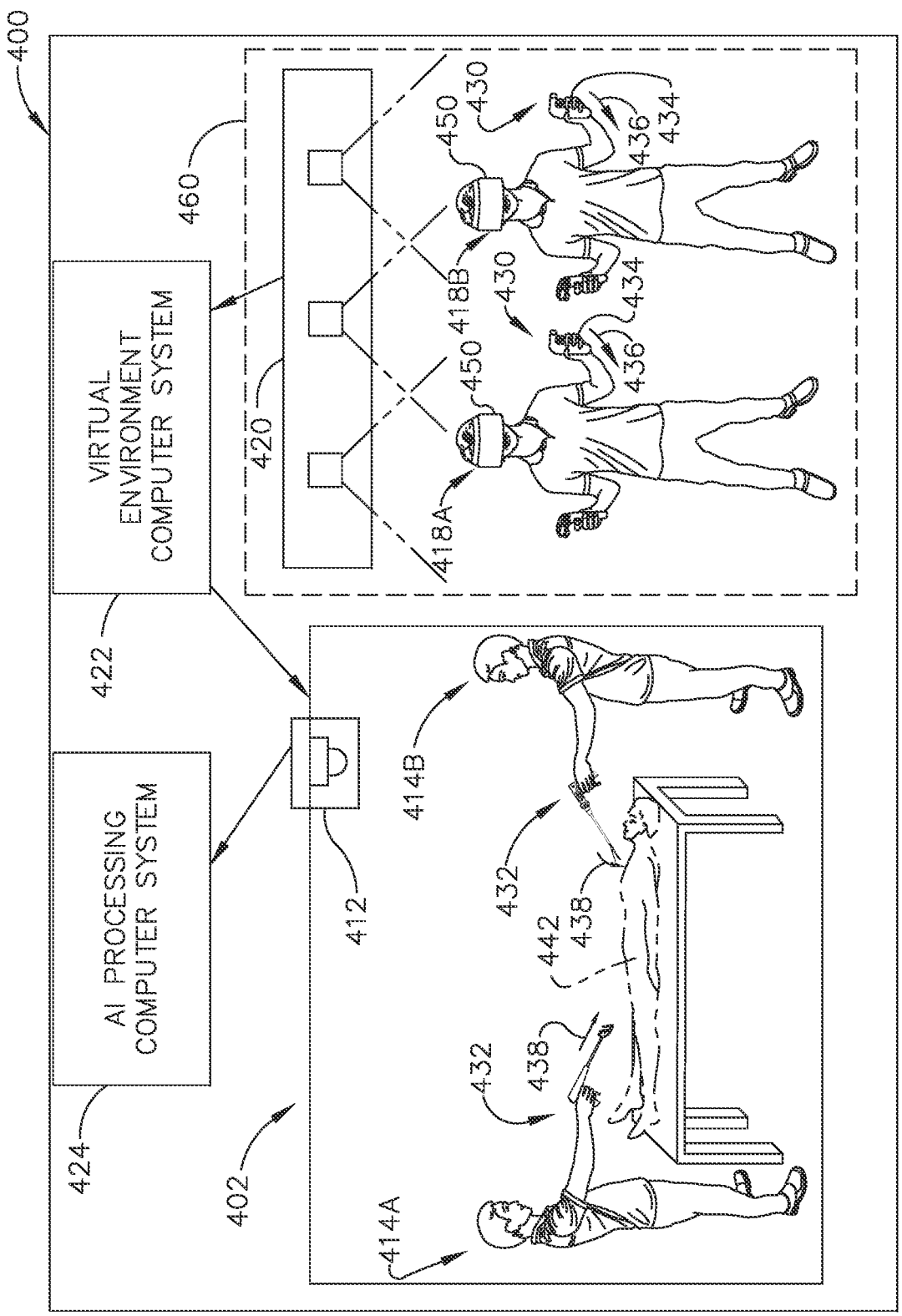
FIG. 4 schematically depicts a virtual AI development environment using multiple human actors in accordance with one non-limiting example.

While FIGS. 1-3 depict virtual AI development environments utilizing a single human actor, this disclosure is not so limited. As illustrate in FIGS. 4-5, for example, multiple human actors can be utilized in virtual AI development environments in accordance with the present disclosure. Referring first to FIG. 4, the depicted virtual AI development environment 400 can be similar to, or the same in many respects as, the virtual AI development environment 300 illustrated in FIG. 3. As shown, however, human actors 418A-B are in a studio 460 of the virtual AI development environment 400. While two human actors are illustrated in FIG. 4, any suitable number of human actors can be physically present in the studio 460, or even simultaneously present in different studios. Similar to previous embodiments, the virtual AI development environment 400 can include a virtual environment computer system 422 and a real-time motion capture system 420. The human actors 418A-B in the studio 460 can utilize VR devices 450 to simultaneously visualize and experience a virtual environment 402 through virtual reality interfaces of the VR devices 450. The human actors 418A-B can also wear a plurality of markers 440 in the studio 460 and/or motion capture gloves 444. Similar to FIG. 4, actions of humanoid avatars 414A-B and positions of other objects in the virtual environment 402 can be recorded by a camera system 412, and the data stream can be fed into and processed by an AI processing computer system 424. Additionally, data from any virtual sensors within the virtual environment 402 can be fed into and processed by an AI processing computer system 424 for processing.

Similar to FIG. 3, some or all of the human actors 418A-B can physically interact with physical training objects 430 that are physically present in the studio 460. In this embodiment, each physical training object 430 comprises a physical actuator 434. While the physical actuator(s) 434 are shown as triggers in FIG. 4, the physical actuator(s) 434 of the physical training object 430 can be any type of interactive element, as provided above. Actuation of the physical actuators 434, as represented by actuation arrows 436, can cause actuation of virtual object 432 presented to the humanoid avatars 414A-B in the virtual environment 402. The virtual objects 432 can be modeled from a real-world physical object associated with the real-world physical environment represented by the virtual environment 402.

In this example embodiment, the virtual environment 402 is a surgical environment and the virtual object 432 is a surgical tool. Furthermore, each virtual object 432 can be a different surgical tool, as shown, although this disclosure is not so limited. The virtual environment 402 can include a virtual patient 442 and other objects or devices found in a surgical environment, for example. Furthermore, similar to previous embodiments, the physical training objects 430 can either be a mock-up of the real-world physical object or the real-world physical object itself.

Though the VR interface provided to the first human actor 418A, at least a portion of a first humanoid avatar 414A can be presented that can replicate the real-time physical motion of the human actor 418A. For example, the human actor 418A can see their extended humanoid arm, legs, and movement thereof through the VR interface of their VR device 450. In addition, the first human actor 418A can be presented with the second humanoid avatar 414B that is replicating the real-time physical motion of the human actor 418B. Thus, while in the studio 460, both human actors 418A-B can simultaneously participate in the same virtual environment 402, while interacting with objects therein, and observing each other's actions.

Figure 5:
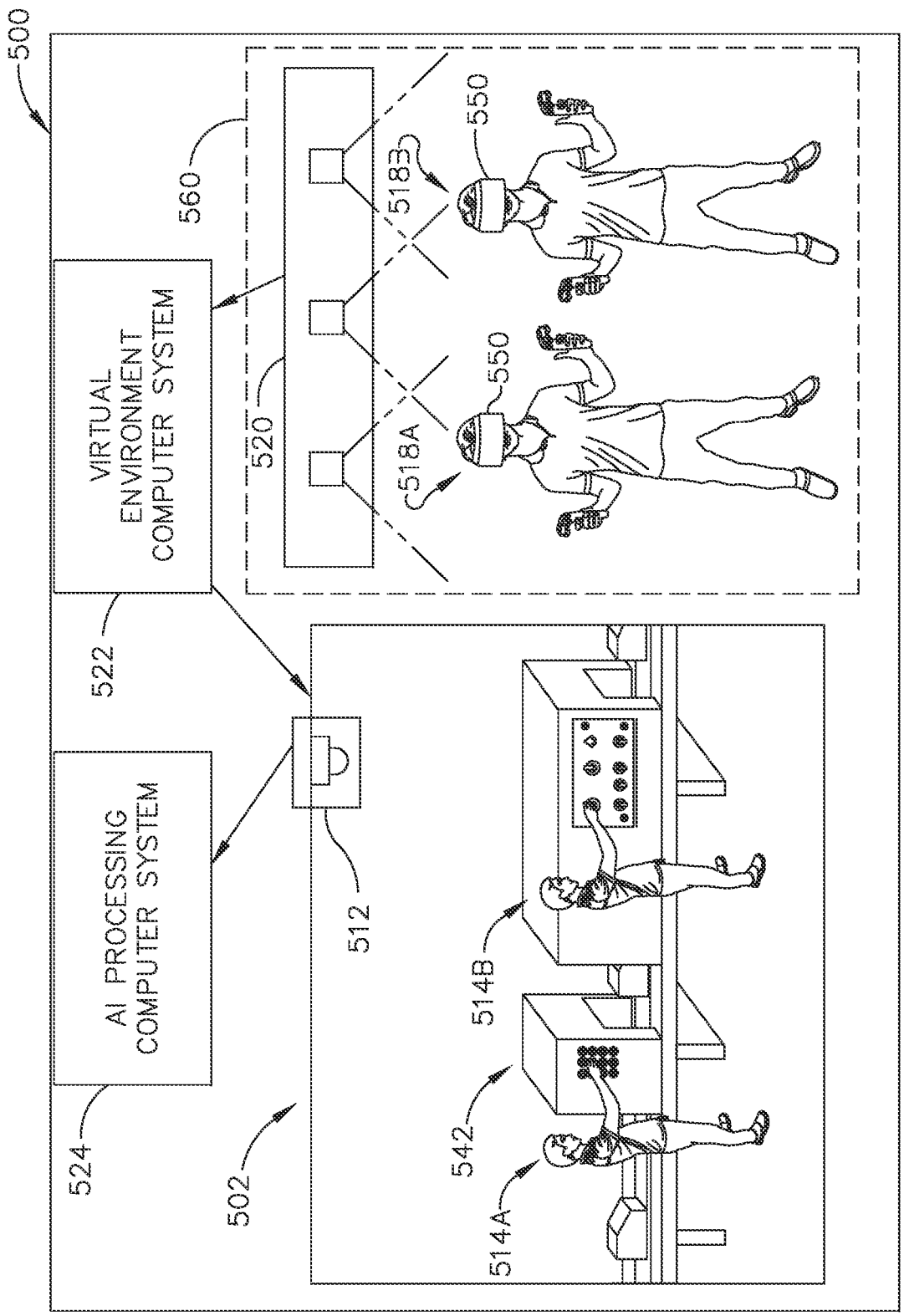
FIG. 5 schematically depicts a virtual AI development environment using multiple human actors in accordance with another non-limiting example.

While FIG. 4 depicts human actors 418A-B interacting with the physical training objects 430, a virtual AI development environment 500 shown in FIG. 5 depicts an environment having multiple human actors 518A-B that are not interacting with physical training objects within studio 560. Various motions or gestures of the human actors 518A-B can be tracked by a motion capture system 520 or other techniques. With the exception of physical training objects 430, the depicted virtual AI development environment 500 can be similar to, or the same in many respects as, the virtual AI development environment 400 illustrated in FIG. 4. As such, the human actors 518A-B are in the studio 560 of the virtual AI development environment 500. The human actors 518A-B in the studio 560 can utilize a virtual environment computer system 522 and the VR devices 550 to simultaneously visualize and experience a virtual environment 502 through virtual reality interfaces of the VR devices 550. The human actors 518A-B can also wear a plurality of markers 540 in the studio 560 and/or motion capture gloves 544. Actions of humanoid avatars 514A-B and positions of other objects in the virtual environment 502 can be recorded by a camera system 512, and the data stream can be fed into and processed by an AI processing computer system 524. Additionally, data from any virtual sensors within the virtual environment 502 can be fed into and processed by an AI processing computer system 524 for processing. In this example embodiment, the virtual environment 502 is a manufacturing environment. The example virtual environment 502 is shown to include manufacturing equipment 542. Through the virtual reality interface, each of the human actors 518A-B can interact with the manufacturing equipment 542. In some embodiments, such interactions may be to train the human actors 518A-B to operate the equipment. Additionally or alternatively, the interaction may be used to design the manufacturing equipment 542, or otherwise test various AI systems that may be deployed in a manufacturing environment.

In general, it will be apparent to one of ordinary skill in the art that at least some of the embodiments described herein can be implemented in many different embodiments of software, firmware, and/or hardware. The software and firmware code can be executed by a processor or any other similar computing device. The software code or specialized control hardware that can be used to implement embodiments is not limiting. For example, embodiments described herein can be implemented in computer software using any suitable computer software language type, using, for example, conventional or object-oriented techniques. Such software can be stored on any type of suitable computer-readable medium or media, such as, for example, a magnetic or optical storage medium. The operation and behavior of the embodiments can be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes described herein can be executed by programmable equipment, such as computers or computer systems and/or processors. Software that can cause programmable equipment to execute processes can be stored in any storage device, such as, for example, a computer system (nonvolatile) memory, an optical disk, magnetic tape, or magnetic disk. Furthermore, at least some of the processes can be programmed when the computer system is manufactured or stored on various types of computer-readable media.

It can also be appreciated that certain portions of the processes described herein can be performed using instructions stored on a computer-readable medium or media that direct a computer system to perform the process steps. A computer-readable medium can include, for example, memory devices such as diskettes, compact discs (CDs), digital versatile discs (DVDs), optical disk drives, or hard disk drives. A computer-readable medium can also include memory storage that is physical, virtual, permanent, temporary, semi-permanent, and/or semi-temporary.

A "computer," "computer system," "host," "server," or "processor" can be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein can include memory for storing certain software modules used in obtaining, processing, and communicating information. It can be appreciated that such memory can be internal or external with respect to operation of the disclosed embodiments.

In various embodiments disclosed herein, a single component can be replaced by multiple components and multiple components can be replaced by a single component to perform a given function or functions. Except where such substitution would not be operative, such substitution is within the intended scope of the embodiments. The computer systems can comprise one or more processors in communication with memory (e.g., RAM or ROM) via one or more data buses. The data buses can carry electrical signals between the processor(s) and the memory. The processor and the memory can comprise electrical circuits that conduct electrical current. Charge states of various components of the circuits, such as solid state transistors of the processor(s) and/or memory circuit(s), can change during operation of the circuits.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

We claim:

1. A computer implemented method, comprising:
   provisioning, by a virtual environment computer system, a virtual environment, wherein the virtual environment is a digital twin virtual environment of a real-world physical environment; wherein the virtual environment comprises:
      a plurality of virtual objects, wherein the plurality of virtual objects are each based on real-world physical objects, and
      a virtual sensor, wherein the virtual sensor is modeled to generate a virtual output corresponding to an output of a real-world sensor of the real-world physical environment;
   collecting, with an artificial intelligence computing system, information based on detection of at least one of the plurality of virtual objects and the virtual output of the virtual sensor for training of the artificial intelligence computing system; and
   testing an accuracy of the artificial intelligence computing system, wherein testing the accuracy is based on the detection of the at least one of the plurality of virtual objects within the digital twin virtual environment.

2. The computer implemented method of claim 1, wherein the real-world physical environment is any of a retail environment, an industrial environment, a medical environment, a marine environment, a manufacturing environment, a military environment, and an outdoor environment.

3. The computer implemented method of claim 1, wherein one or more of the plurality of virtual objects are based on variations of retail products.

4. The computer implemented method of claim 1, and wherein one or more of the plurality of virtual objects are modeled from real-world surgical instruments.

5. The computer implemented method of claim 1, wherein at least one of the plurality of virtual objects is modeled from a human.

6. The computer implemented method of claim 1, wherein at least one of the plurality of virtual objects is modeled from a robotic system.

7. The computer implemented method of claim 1, wherein provisioning the virtual environment further comprises provisioning the virtual environment to a human actor through a virtual reality interface.

8. The computer implemented method of claim 7, further comprising:
   tracking, by the virtual environment computer system, physical motion of the human actor.

9. The computer implemented method of claim 5, wherein the information collected from the digital twin virtual environment is based on an action of the human.

10. The computer implemented method of claim 1, wherein testing the artificial intelligence computing system comprises varying an operational condition of the digital twin virtual environment.

11. The computer implemented method of claim 10, wherein the operational condition is any of a lighting level of the digital twin virtual environment, a sensor position, a sensor type, a sensor parameter, a lens parameter, and a camera parameter.

12. The computer implemented method of claim 10, varying the operational condition comprises varying as least one of the plurality of virtual objects provisioned in the virtual environment.

13. The computer implemented method of claim 10, wherein testing the artificial intelligence computing system comprises providing data variability in the virtual environment provisioned by the virtual environment computer system.

14. The computer implemented method of claim 1, wherein one or more of the plurality of virtual objects are based on a real-world physical object that is in existence at the time of the modeling.

15. The computer implemented method of claim 1, wherein one or more of the plurality of virtual objects are based on a proposed real-world physical object.

16. The computer implemented method of claim 1, wherein the virtual sensor comprises a camera.

17. The computer implemented method of claim 1, wherein the virtual environment comprises a plurality of virtual sensors.

18. A computer implemented method, comprising:
   provisioning, by a virtual environment computer system, a virtual environment, wherein the virtual environment is a digital twin virtual environment of a real-world physical environment comprising a plurality of real-world physical objects and a real-world sensor, wherein the virtual environment comprises a plurality of virtual objects and a virtual sensor, wherein each of the plurality of virtual objects are based on a respective one of the plurality of real-world physical objects, wherein the virtual sensor is any of a LiDAR system, a motion sensor, an infrared system, and a camera system;
   collecting, with an artificial intelligence computing system, information from the digital twin virtual environment, wherein the information is based on detection of at least one of the plurality of virtual objects and an output of the virtual sensor; and
   varying an operational condition of the digital twin virtual environment to test the accuracy of the artificial intelligence computing system.

19. The computer implemented method of claim 18, wherein provisioning the virtual environment further comprises provisioning the virtual environment to a human actor through a virtual reality interface.

20. The computer implemented method of claim 19, further comprising:
tracking, by the virtual environment computer system, physical motion of the human actor.

21. The computer implemented method of claim 18, wherein the virtual environment comprises a plurality of different types of virtual sensors.

22. The computer implemented method of claim 18, further comprising
automatically calibrating the artificial intelligence computing system based on whether the artificial intelligence computing system correctly detected the at least one of the plurality of virtual objects.

23. The computer implemented method of claim 18, further comprising:
improving the accuracy of the artificial intelligence computing system by providing data variability in the virtual environment provisioned by the virtual environment computer system.

24. The computer implemented method of claim 18, wherein at least one of the plurality of real-world physical objects is a human and wherein at least one of the plurality of virtual objects is an avatar of the human.

25. A computer implemented method, comprising:
provisioning, by a virtual environment computer system, a virtual environment to a human actor through a virtual reality interface, wherein the virtual environment is a digital twin virtual environment of a real-world physical environment, wherein the virtual environment comprises a virtual sensor modeled to generate a virtual output corresponding to an output of a real-world sensor, wherein a virtual object is presented to the human actor in the digital twin virtual environment through the virtual reality interface, wherein the virtual object is based on a real-world physical object associated with the real-world physical environment, wherein a physical training object is physically positioned proximate to the human actor;
tracking, by the virtual environment computer system, physical motion of the human actor;
tracking, by the virtual environment computer system, an interaction of the human actor with the physical training object;
collecting information from the digital twin virtual environment with an artificial intelligence computing system; and
testing the artificial intelligence computing system, wherein the testing is based on the tracking of the physical motion of the human actor, the tracking of the interaction of the human actor with the physical training object, and the detection of the virtual object.

26. The computer implemented method of claim 25, wherein the physical training object and the human actor are in a studio.

27. The computer implemented method of claim 25, wherein the virtual output of the virtual sensor is modeled to correspond to an output of a real-world sensor, where the real-world sensor is any of a LiDAR system, a motion sensor, an infrared system, and a camera system.

28. The computer implemented method of claim 27, wherein the virtual environment comprises a plurality of virtual sensors, wherein each of the plurality of virtual sensors are modeled to correspond to an output of a respective real-world camera.

29. A computer implemented method, comprising:
provisioning, by a virtual environment computer system, a virtual environment, wherein the virtual environment is a digital twin virtual environment of a real-world physical environment; wherein the virtual environment comprises:
a plurality of sub-systems that are each modeled to generate a virtual output corresponding to an output of a respective real-world sub-system, wherein the plurality of sub-systems comprise any of a LiDAR system, a motion sensor, an infrared system, and a camera system;
a plurality of virtual objects, wherein the plurality of virtual objects are each modeled from real-world physical objects associated with the real-world physical environment, and
collecting, with an artificial intelligence computing system, information from the digital twin virtual environment to train the artificial intelligence computing system, wherein the information is based on detection of at least one of the plurality of virtual objects and the virtual output of the plurality of sub-systems, and wherein the artificial intelligence computing system is for use at the real-world physical environment that comprises the real-world sensor and the real-world sub-system; and
prior to use of the artificial intelligence computing system at the real-world physical environment, testing the artificial intelligence computing system, wherein the testing is based on the detection of the at least one of the plurality of virtual objects within the digital twin virtual environment.

30. The computer implemented method of claim 29, wherein the plurality of sub-systems comprise the LiDAR system, the motion sensor, the infrared system, and the video system.

31. The computer implemented method of claim 29, wherein at least one of the plurality of virtual objects is modeled from a human.

32. The computer implemented method of claim 29, wherein provisioning the virtual environment further comprises provisioning the virtual environment to a human actor through a virtual reality interface.

* * * * *

UNITED STATES PATENT AND TRADEMARK OFFICE
CERTIFICATE OF CORRECTION

| | | |
|---|---|---|
| PATENT NO. | : 11,914,761 B1 | Page 1 of 1 |
| APPLICATION NO. | : 18/143659 | |
| DATED | : February 27, 2024 | |
| INVENTOR(S) | : Richard Raymond Schweet et al. | |

It is certified that error appears in the above-identified patent and that said Letters Patent is hereby corrected as shown below:

In the Claims

Claim 4, Column 11, Lines 62-63, change "claim 1, and wherein" to --claim 1, wherein--;
Claim 12, Column 12, Lines 25-26, change "claim 10, varying" to --claim 10, wherein varying--; and
Claim 30, Column 14, Lines 45-46, change "and the video system" to --and the camera system--.

Signed and Sealed this
Eleventh Day of June, 2024

*Katherine Kelly Vidal*

Katherine Kelly Vidal
*Director of the United States Patent and Trademark Office*